Figure 5:
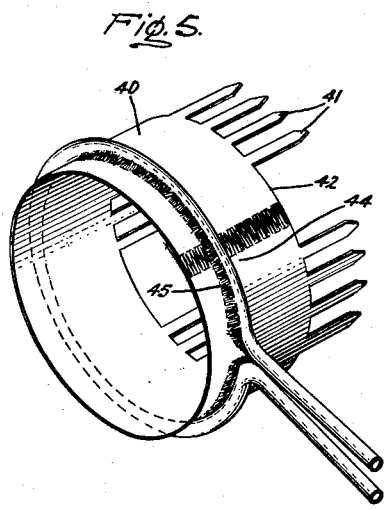

Nov. 5, 1963     P. W. THOMPSON ETAL     3,109,947
COOLING SYSTEM FOR DYNAMOELECTRIC MACHINES
Filed June 26, 1959     2 Sheets-Sheet 1
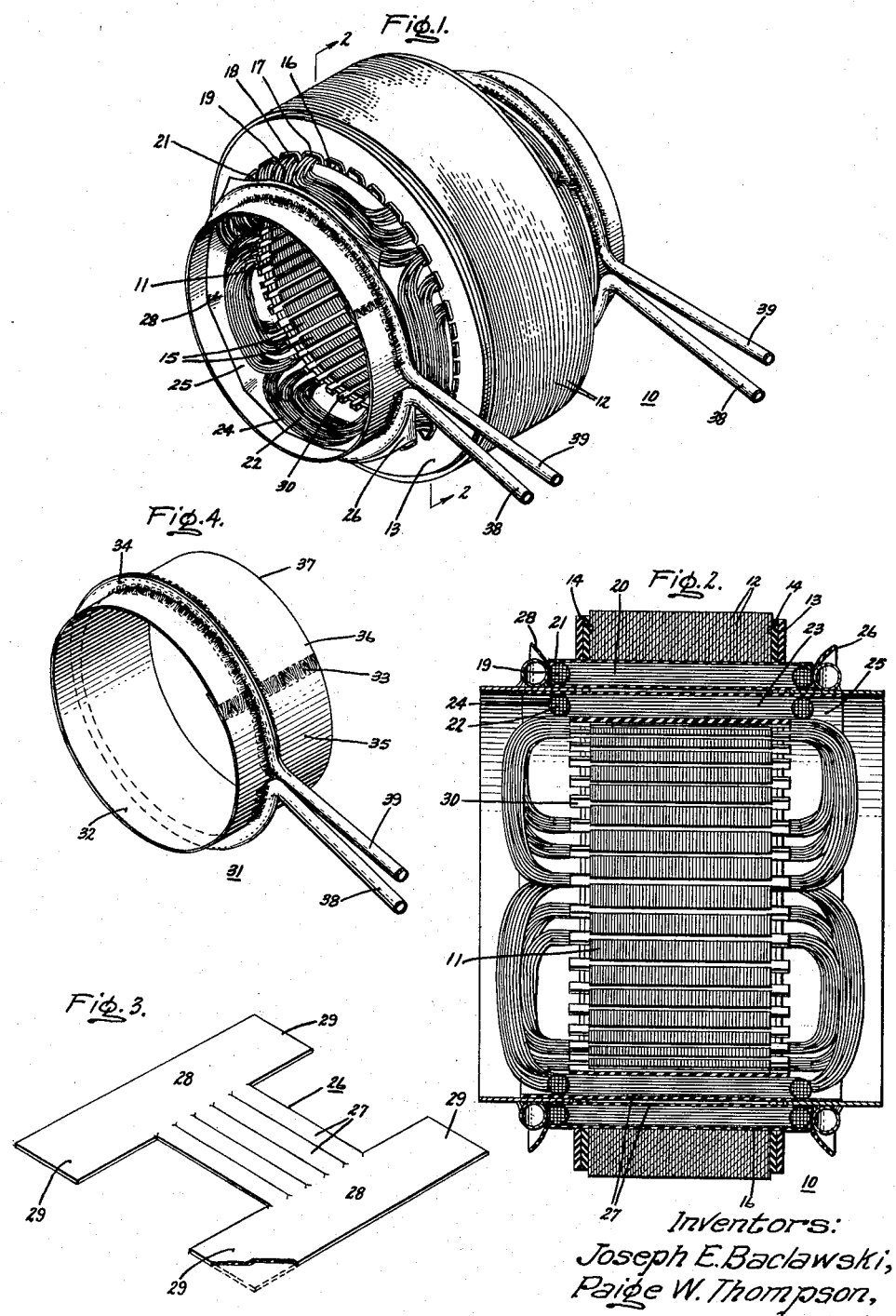
Inventors:
Joseph E. Baclawski,
Paige W. Thompson,
by H. F. Manbeck, Jr.
Attorney.

Nov. 5, 1963 P. W. THOMPSON ETAL 3,109,947
COOLING SYSTEM FOR DYNAMOELECTRIC MACHINES
Filed June 26, 1959 2 Sheets-Sheet 2

Inventors:
Joseph E. Baclawski,
Paige W. Thompson,
by H. F. Manbeck, Jr.
Attorney.

United States Patent Office 3,109,947
Patented Nov. 5, 1963

3,109,947
COOLING SYSTEM FOR DYNAMOELECTRIC MACHINES
Paige W. Thompson, Albany, Ill., and Joseph E. Baclawski, Fort Wayne, Ind., assignors to General Electric Company, a corporation of New York
Filed June 26, 1959, Ser. No. 823,088
7 Claims. (Cl. 310—64)

This invention relates to dynamoelectric machines and other rotating devices and more particularly to an improved arrangement for cooling an electric motor.

It is well known, of course, that electric motors are generally formed with a magnetic stator core member having excitation windings provided in appropriate stator core winding slots. It is sometimes necessary to operate these motors in a rarified atmosphere and in relatively inaccessible and enclosed places, such as for example, in aircraft and missile applications. When motors are used under these conditions, in the past, great difficulty has been experienced in satisfactorily dissipating the heat generated by the stator core or by the current passing through the windings while keeping the size and weight of the motor to a minimum. If this generated heat is not effectively removed from the motor, the heat will have the general effect of increasing the resistance of the windings and the total temperature rise of the motor, thereby producing a marked decrease in motor performance. Further, increased operating temperatures may injure the temperature sensitive component parts of the motor; e.g., winding insulation which lose their mechanical and dielectric strengths at high temperatures, eventually resulting in premature motor failure. Then, too, the ultimate manufacturing cost is always a factor involved in the mass production of such motors.

Thus, it can be seen that a satisfactory arrangement for cooling motors is a continuing problem in the motor industry, particularly in those situations where it is important that the motors provide a maximum output or high efficiency with a minimum of weight, size and expense.

Therefore, it is a principal object of the present invention to provide a dynamoelectric machine with a cooling system which effectively removes heat generated in the cores and windings of such apparatus at a minimum of weight, size and expense.

Another object of our invention is to provide a cooling arrangement for an electric motor which is in intimate heat conducting relationship with a stator core and windings and which is effective to keep the winding end turns in a cool condition even when the electric motor is operated in a rarified atmosphere or in a substantially enclosed structure having dead air spaces adjacent the stator core and winding end turns.

Further objects and advantages will become apparent as the following description proceeds and the subject matter which we regard as our invention is pointed out with particularity in the claims annexed to and forming a part of this specification.

In carrying out the objects of the present invention in one form thereof, we provide an electric motor having a stator core and a bore with a plurality of windings arranged on the core. These windings have end turn portions extending beyond each side face of the core and a heat dissipating means is disposed in intimate thermal contact with at least one of the end turn portions. The heat dissipating means comprises a heat conducting member having a substantially annular sheet-like surface of greater diameter than the bore and a tube for carrying coolant therethrough attached to the surface of the sheet-like member in intimate heat transfer relation with both the end turn portions and the sheet-like member.

During operation of the motor, the sheet-like surface and the tube cooperate to provide a large surface area of heat transfer which effectively conducts heat, generated in the stator core, away from the internal portion of the motor and transfers it to the cooling fluid circulating through the tube. The fluid, in turn, carries the heat to a suitable heat exchange means located externally of the motor thereby keeping the motor relatively cool during operation.

For a better and more complete understanding of the present invention, reference should be had to the following description taken in connection with the accompanying drawings, and its scope will be pointed out in the appended claims.

Figure 6:
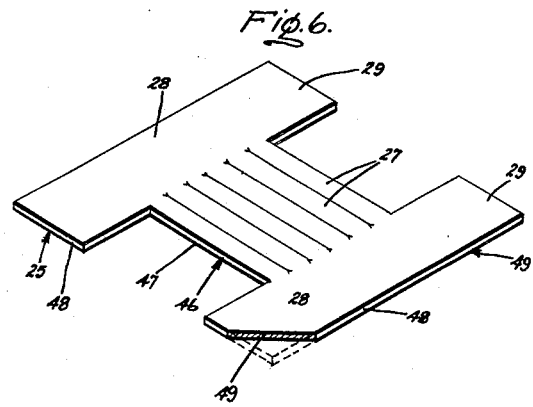
Figure 7:
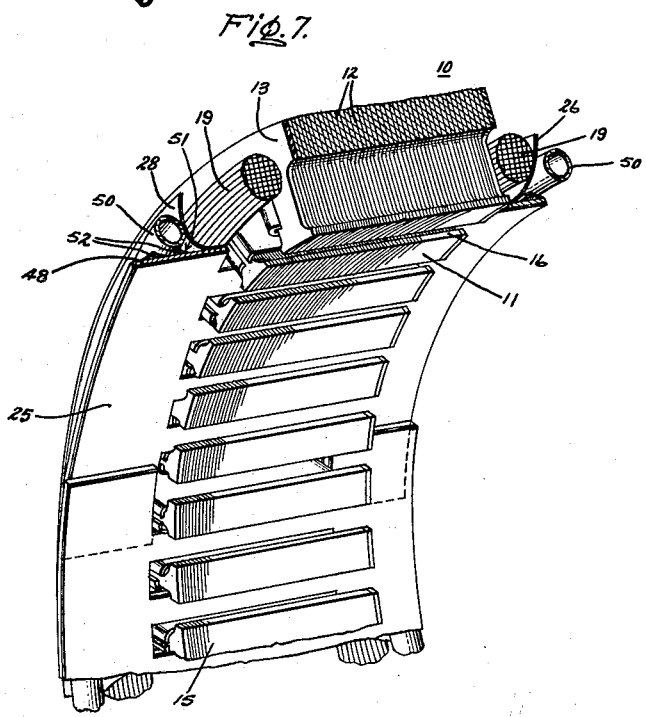

In the drawings:
FIG. 1 is a view in perspective of an electric motor stator core incorporating our invention in one form thereof;
FIG. 2 is a sectional view taken on line 2—2 of FIG. 1;
FIG. 3 is a view in perspective, broken away in part, of one of the electrical insulation members utilized in the stator core shown in FIGS. 1 and 2;
FIG. 4 is a view in perspective of the heat dissipating means of the first embodiment employed on the stator core shown in FIGS. 1 and 2;
FIG. 5 is a view in perspective of another embodiment of the present invention;
FIG. 6 is a view in perspective, broken away in part, illustrating another form of the present invention; and
FIG. 7 is a view in perspective of a section of a stator core, partially assembled, with the embodiment of FIG. 5 arranged thereon.

Referring now to the drawings in more detail, FIGS. 1 and 2 illustrate one form of the present invention, by way of example only, as applied to a motor stator core member, generally indicated at 10, of a single phase alternating current induction motor. Stator member 10 comprises a magnetic core having a rotor receiving bore 11 and is formed of a plurality of stacked laminations 12, secured together in the usual manner. A suitable end lamination insulating means 13, such as a pair of fiber board members, are disposed on and cover each side surface or face 14 of the stack of laminations. Stator teeth 15 form between them winding slots 16 which communicate with bore 11 and extend radially outward therefrom. Each slot 16 is provided with a conventional liner 17, formed of a strip of suitable insulating material, such as described in Patents 2,169,097 and 2,180,983 to Hall. These slot liners are formed with cuffed ends 18 in the usual fashion and, as shown, extend axially beyond the end lamination insulating means 13.

A main or running winding 19, wound with a plurality of turns of enameled magnet wire, has coil sides 20 arranged within the bottom of slots 16, away from bore 11, and has end turns 21 extending axially beyond insulating means 13. Arranged beneath the main winding 19 is a start winding 22 having coil sides 23 distributed within the slots, and end turns 24 extending outside of the winding slots. Preferably, the windings 19 and 22 are electrically insulated one from the other by top and bottom electrical insulating members 25 and 26, respectively, disposed between the windings. These insulating members may be identical in configuration, being constructed from any suitable, relatively thin, electrical insulating sheet material, such as a sheet composed of polyethylene terephthalate.

One of the electrical insulating members, bottom member 26, is illustrated in detail in FIG. 3. As shown, it is made in a unitary piece with a plurality of parallel axially extending body portions 27. These body portions are adapted to fit within and completely cover the width of slots 16 between main winding sides 20 and start winding side 23 (see FIG. 2). Body portions 27 are integrally joined at each end by end portions 28 having transverse extensions 29, which are adapted to overlap with the adjacent extensions in the assembled stator core assembly. As seen in FIGS. 1 and 2, once the insulating members 25 and 26 are properly positioned in the winding slot 16, with start winding 22 disposed beneath them, insulation wedges 30 are placed in each slot opening, between start winding 22 and bore 11, to hold the windings in position and to close the entrance of slot 16 thereby completing the winding and stator core assembly.

Referring now to FIG. 4, there is illustrated one embodiment of the heat dissipating means, generally indicated at 31, of the present invention. Means 31, which may be conveniently fabricated prior to its assembly onto stator core member 10, comprises a heat conductive member 32, preferably formed into a substantially annular or cylindrical configuration from a rectangular sheet of high thermal conductive material, for example copper, with one pair of opposing sides of the sheet being brazed or welded together, characterized by numeral 33, and a tube 34, also composed of a high thermal conductive material, for carrying any suitable coolant or cooling fluid therethrough. As shown, tube 34 is firmly fixed in intimate thermal contact with the outer sheet-like surface 35 of member 32 for almost the entire circumference thereof, by any suitable means which will provide a good heat exchange between the parts, such as by welding, brazing or the like, generally indicated at 36. For reasons which will become apparent hereinafter, it is preferred that tube 34 be connected to cylindrical member 32 at an axial distance from cylinder edge 37, such that in its finally assembled position on the stator core assembly, tube 34 will be adjacent or in contiguous association with the outer end of the main winding end turns 21. Ends 38 and 39 of tube 34 extend radially outwardly away from the cylindrical member 32 and are adapted to be connected, by any standard means, to a suitable heat exchange (not shown). The significance of the above described arrangement will become more apparent as the description proceeds.

After the heat dissipating means 31 is produced in the manner set forth above, it may be assembled onto the stator core member 10, heretofore described, merely by inserting cylindrical member 32 between end portions 28 of the respective electrical insulating members 25 and 26, with the cylinder edge 36 disposed towards the end lamination insulating means 13. Thus, as viewed in FIGS. 1 and 2, heat dissipating means 31 has edge 36 adjacent end lamination insulating means 13 in the completely assembled stator core and is held in place by the respective winding end turn portions, which are effectively in engagement with cylindrical member 32. In addition, it will be observed that end portions 28 of the bottom insulating members 26 are arranged between a portion of the outer cylindrical surface 35 and the adjacent portion of the main winding end turns 21, as well as between tube 34 and the adjacent end surface of the main winding end turns. In a similar fashion, the end portions of the top insulating member 25 electrically insulate the inner surface of the cylindrical member 32 from the adjacent start winding end turns 24. Heat dissipating means 31 is therefore electrically insulated from the winding end turns 21 and 24 by the respective insulating members 25 and 26 and the possibility of the heat dissipating means interfering with the electrical characteristics of the windings is obviated. Moreover, since the insulating members 25 and 26 are relatively thin in cross section (as mentioned heretofore) they will not effectively impede the flow of heat from the stator core and windings to the heat dissipating means 31 when the stator core is used in actual operation.

The stator core unit, in its completely assembled form, may be utilized in any suitable dynamoelectric machine (not shown) with the tube ends 38 and 39 extending beyond the machine frame and being connected in any well-known manner to a suitable apparatus or heat exchanger, which is adapted to circulate a coolant through tube 34 thereby causing the heat imparted thereto during operation of the machine to be effectively carried away from the stator core and the winding end turns.

It can be seen from the foregoing that the improved arrangement provides a substantially direct heat-transfer from the stator core member and the windings to a heat dissipating means. Due to the high thermal conductivity of the component parts of the heat dissipating means and to their large compostie area of intimate thermal contact with the exposed winding end turns, as well as with each other, an ample path of low resistance to the flow of heat is created. During operation of a machine embodying the present invention, heat generated in the core member and windings will therefore be efficiently transferred to the heat dissipating means and imparted to circulating coolant which will, in turn, then carry the heat away from the interior of the machine to areas of lesser temperatures thereby keeping the machine in a relatively cool operating condition.

It will be readily apparent that the heat dissipating means may be provided at both ends of the stator core member, as illustrated, for the most effective cooling arrangement, or if preferred, at only one end thereof. Further, the present invention may be utilized whether a single layer or any number of layers of windings are used in the stator construction. In addition, it may be desirable, under certain circumstances, to electrically insulate the heat dissipating means from the windings by any well-known integral insulation means, rather than by insulating members 25 and 26. Moreover, in certain applications of the present invention it may be more desirable to attach the tube to the inner surface of the heat conducting member, with the ends 38 and 39 of the tube running axially out from the motor interior.

Thus, it should be obvious to those skilled in the art that the present invention is not limited to the embodiment set forth above, but our improved arrangement with its inherently superior cooling effect may be varied without a departure from the true scope and spirit of the invention. For instance, FIG. 5 illustrates a second variation of the heat dissipating means described heretofore and shown in FIGS. 1 through 4 inclusive.

The heat dissipating means of the second embodiment comprises a heat conducting member 40, preferably formed from a sheet of material, having a plurality of axially extending end projection portions or fingers 41 which are integrally provided on one edge 42 thereof, and a coolant carrying tube 43, which is fixed in intimate thermal contact with the outer sheet-like surface 44 of member 40 for almost the entire circumference thereof by brazing or the like shown at 45. The fingers 41 are adapted to fit into the winding slots of a stator core such as illustrated in FIG. 1, and may correspond to the number of winding slots provided in the stator core, or, if desired, heat conducting member 40 may be formed, as shown in FIG. 5, with a less number of fingers than the accommodating winding slots. As before, it is preferred that both tube 43 and member 40 be constructed from high thermal conductive material and that tube 43 be attached to the heat conducting member 40 at a predetermined axial distance from edge 42.

The heat dissipating means of the second embodiment may be assembled onto a stator core, for example one identical in construction to that shown in FIG. 1, after the main windings 19 and bottom insulating members 26 are arranged thereon, but prior to the placement of the top insulating members 25 and start windings into the appropriate winding slots. Once the heat dissipating means is properly in place with fingers 41 disposed in the accommodating winding slots 16, and the tube 43 positioned adjacent the main winding end turns, the stator and winding assembly may be completed by inserting the top insulating members 25, start windings 22 and insulation wedges in the manner described for the first embodiment.

As described for the modification illustrated by FIGS. 1–4, the variation of FIG. 5 will have the same advantageous and highly desirable cooling effect for the motor during its operation. Further, the fingers 41 of the second variation act as heat conducting elements and augment the transmission of the heat, generated internally of the stator core, away from the interior parts of the core.

FIGS. 6 and 7 illustrate another possible variation of our new and improved heat dissipating means and, for ease of representation, like reference characters designate identical parts heretofore described in connection with the first embodiment.

Referring now specifically to FIG. 6, it will be seen that a heat conducting member 46, preferably made from a sheet of high thermal conductive material, may take the form of the electrical insulating members 25 and 26, previously described in detail and illustrated in FIG. 3. As shown, member 46 is sandwiched between insulating members 25 and 26 which, for convenience of assembly, may be attached thereto prior to its assembly onto the stator core by any suitable adhesive means, applied for instance to body portions 27 of the individual insulating members. Heat conducting member 46 therefore essentially comprises a plurality of flat axially extending heat conducting body portions 47 of such width as to fit easily within the winding slots of the stator core and, preferably completely covering the width of the slots. End portions 48, having transverse extensions 49, integrally join the body portions 47 at each end thereof.

For purposes of illustration only, FIG. 7 shows several of the heat conducting members 40 and the top and bottom insulating members 25 and 26 arranged on a section of a stator core of the type shown in FIGS. 1 and 2. It will be observed from FIG. 7 that once the heat conducting members 40 are properly disposed on the stator core 10, in juxtaposition to the main winding 19, the heat conducting body portions 47 will be positioned within winding slots 16 and the end portions 48 will extend axially beyond the slots. It should be noted at this point that, although a body portion 47 is shown as being distributed in each slot 16, the end portions of the adjoining individual members 40, being conterminous, form in effect a continuous substantially annular sheet-like surface for heat transfer purposes, and thus permit the utilization of a fewer number of body portions than the number of slots, if desired.

With the heat conducting and electrical insulation members in place on the stator core member, the core and winding assembly may be finally assembled in accordance with the procedure heretofore outlined. Thereafter, the heat dissipating means of the third embodiment may be completed by merely lifting the end portions 28 of the bottom insulating member 26 out of engagement with the heat conducting member 40 and attaching a cooling fluid carrying tube 50 to the outer surface 51 of the individual heat conducting members 40, as indicated at 52, in a fixed thermal contact with the sheet-like surface for almost the entire circumference thereof adjacent the main winding end turns.

With this arrangement, it will be observed that the insulating members 25 and 26 will electrically insulate the windings from the heat dissipating means in the same fashion as previously described for the other modifications. The modification of FIGS. 6 and 7 will also have the same desirable features possessed by the other embodiments of the present invention. For example, the individual heat conducting members 40 form a sheet-like surface which is interposed between and contiguous with the end turns of the respective windings, and with tube 50 fixed in intimate thermal relation therewith adjacent the winding end turns, provide a large and effective surface area for the conduction of heat away from the stator core. In addition, the body portions of the heat conducting members, being in direct heat transfer relation with the internal parts of the stator core and windings, promote the dissipation of heat from these parts by effectively conducting the heat, generated internally of the stator core during motor operation, to the cooling fluid carrying tube 50 through the intermediary end portions 48.

The many advantages of the present invention will be obvious to those skilled in the art. For example, the heat conducting members of the various modifications are relatively inexpensive to manufacture, since each may be stamped from suitable sheet material and a cooling fluid carrying tube may be joined thereto in a simple, yet highly effective heat conducting manner. Further, the heat dissipating means are extremely versatile in nature and may be added to any number of standard types of motors at a minimum of assembly costs without unduly increasing the overall size or weight of the motor. Moreover, the above described structural features of the present invention provide an efficient means to remove heat from the motor interior under conditions wherein other arrangements; e.g. fan type, would be ineffectual thereby keeping the motor relatively cool during operation and contributing towards more efficient motor operation.

It should be apparent to those skilled in the art that what we have shown and described above are three embodiments of our invention in accordance with the patent statutes, and changes may be made in the structure disclosed without departing from the true spirit and scope of the invention. We therefore intend in the following claims to cover all such equivalent variations as found within the invention.

What we claim as new and desire to secure by Letters Patent of the United States is:

1. For use in a dynamoelectric machine, a stator core member having a bore, a plurality of windings arranged on said core member with end turn portions extending beyond each side face of said member, heat dissipating means provided adjacent at least one side face of said core member, said heat dissipating means including a substantially annular, sheet-like surface of greater diameter than said bore disposed in intimate heat transfer relation with at least one of said end turn portions and a tube for carrying cooling fluid therethrough being attached to said sheet-like surface whereby heat generated in said stator core member during operation of the dynamoelectric machine is effectively transferred to the cooling fluid and dissipated from said stator core member.

2. For use in a dynamoelectric machine, a stator core member having a bore, a plurality of winding slots radially disposed from said bore having a plurality of windings arranged therein with end turn portions extending axially beyond each side face of said member, a heat dissipating means provided adjacent at least one side face of said core member, means electrically insulating said windings from said heat dissipating means, said dissipating means including a cylindrical heat conducting member formed of a high thermal conductive material of greater diameter than said bore disposed in heat transfer relation with at least one of said end turn portions, and a tube for carrying cooling fluid therethrough fixed in heat transfer relation to said cylindrical member whereby heat generated in said core member during operation of the dynamoelectric machine is effectively transferred to the cooling fluid and dissipated from said stator core member.

3. In a dynamoelectric machine, a stator core having a bore, a plurality of windings arranged on said core, one winding disposed radially beyond the other with end turn portions extending beyond each side face of said core, a sheet-like heat conducting member of greater diameter than said bore formed of a substantially rectangular sheet of high thermal conductive material positioned between said windings on at least one side of said core adjacent to and in intimate heat transfer relation with at least one of said end turn portions, a tube for carrying a cooling fluid therethrough secured in a fixed intimate thermal contact with an outer surface of said sheet-like member for almost the entire circumference thereof and adjacent to said end turn portions, means electrically insulating said windings from both said tube and said sheet-like member, said tube and said sheet-like member cooperating to dissipate heat generated in said stator core during operation of said machine whereby said heat is effectively transferred to the cooling fluid and carried away from said stator core.

4. In a dynamoelectric machine, a stator core member having a bore, a plurality of winding slots radially spaced from said bore, running and start windings, positioned within said slots one over the other and having end turn portions extending beyond the side faces of said core member, a plurality of electrical insulating members disposed within said slots between said running and said starting windings and extending beyond said core faces, a cylindrical heat conducting member of greater diameter than said bore formed of a substantially rectangular sheet of high thermal conductive material positioned adjacent each side of said core member between said end turn portions of the respective windings in intimate heat transfer relation therewith, a tube for carrying a cooling fluid therethrough secured to each of said cylindrical members in direct heat transfer relation therewith for almost the entire circumference of said cylindrical member, said tube being positioned axially beyond and in abutting relation with said winding end turn portions, said main windings being electrically insulated from both said tube and said cylindrical member by some of said insulating members disposed therebetween, said start windings being electrically insulated from said cylindrical member by the other insulating members, said tube and said cylindrical member forming a heat dissipating means at each end of said stator core member whereby heat generated in said stator core member during operation of said dynamoelectric machine is effectively transferred to the cooling fluid and carried away from the interior of said machine.

5. In a dynamoelectric machine, a stator core having a bore, a plurality of windings arranged on said core with end turn portions extending beyond each side face of said core, a cylindrical heat conducting member of greater diameter than said bore formed of a substantially rectangular sheet of high thermal conductive material having a plurality of axially extending fingers formed at one end thereof, said cylindrical member positioned adjacent at least one side of said core member between said end turn portions of the respective windings in heat transfer relation therewith with said fingers being disposed in said slots in contact with said windings, a tube for carrying a cooling fluid therethrough secured in direct heat transfer relation to said cylindrical member adjacent and axially beyond said winding end turn portions, means electrically insulating said windings from said cylindrical member and said tube, said tube and said cylindrical member cooperating to dissipate heat generated in said stator core member during operation of said dynamoelectric machine whereby said heat is effectively transferred to the cooling fluid and carried away from said stator core.

6. In a dynamoelectric machine, a stator core having a bore, a plurality of winding slots radially spaced from said core, windings positioned within said slots and having end turn portions extending axially beyond each side face of said core, a plurality of heat conducting members formed from a sheet of high thermal conducting materials disposed within said slots and having portions extending axially beyond each side face of said core forming a sheet-like heat transfer surface of greater diameter than said bore, said heat conducting members being in intimate heat transfer relation with said windings, a tube for carrying a cooling fluid therethrough secured in a fixed intimate thermal contact on said heat conducting member portions adjacent to said winding end turn portions, said heat conducting members and said tubes cooperating to dissipate heat generated in said stator core during operation of said machine whereby said heat is effectively transferred to the cooling fluid and carried away from said stator core.

7. In a dynamoelectric machine a stator core having a bore, a plurality of winding slots radially spaced from said bore, running and start windings positioned within said slots one over the other and having end turn portions extending beyond each side face of said core, a plurality of electrical insulating members disposed within said slots between said running and start windings and having portions extending beyond said core faces, a plurality of heat conducting members disposed within said slots between said electrical insulating members and having portions extending axially beyond each of said core side faces forming a sheet-like surface of greater diameter than said bore, said heat conducting members being in intimate heat transfer relation with said running and start windings, a tube for carrying cooling fluid therethrough secured in a fixed intimate thermal contact to said heat conducting portions adjacent at each side of said stator core said winding end turn portions, said main windings being electrically insulated from said tubes and from said heat conducting members by some of said insulating members disposed therebetween, said start windings being electrically insulated from said tubes and from said heat conducting members by the other insulating members, said heat conducting members and said tubes cooperating to dissipate heat generated in said stator core during operation of said machine whereby said heat is effectively transferred to the cooling fluid and carried away from said stator core.

References Cited in the file of this patent

UNITED STATES PATENTS

| 2,255,910 | Baudry | Sept. 16, 1941 |
| 2,844,745 | Hamm | July 22, 1958 |
| 2,906,208 | White | Sept. 29, 1959 |
| 2,921,208 | Morrill | Jan. 12, 1960 |

FOREIGN PATENTS

| 433,209 | Germany | Aug. 24, 1926 |
| 579,316 | Germany | June 23, 1933 |